UNITED STATES PATENT OFFICE.

HARRY LUCKENBACH, OF SEATTLE, WASHINGTON, ASSIGNOR OF ONE-HALF TO WILLIAM McPHEE, OF ARLINGTON, WASHINGTON.

ART OR PROCESS OF TREATING ORES.

SPECIFICATION forming part of Letters Patent No. 663,914, dated December 18, 1900.

Application filed December 1, 1899. Serial No. 738,904. (No specimens.)

*To all whom it may concern:*

Be it known that I, HARRY LUCKENBACH, a citizen of the United States, residing at Seattle, in the county of King and State of Washington, have invented certain new and useful Improvements in the Art or Process of Treating Ores, of which the following is a specification.

The principal object of my invention consists in preparing refractory or other ores that they may be crushed or broken on an economical commercial basis for the extraction of the contained metal by using a new and useful process.

My invention essentially consists in treating the ore while at a high temperature with niter cake, which I have found to exercise a powerful corrosive effect on the ore, particularly at the crevices thereof, and subsequently, while the ore is still hot, quenching it with water, whereby a powerful opening up and disintegrating effect is produced, which is found to be peculiarly advantageous, as a preliminary to milling or amalgamation, according to the character of the material. I have found that by the action of this agent at such temperature gold ores that in their raw state are not susceptible to amalgamation are rendered amalgamable, while ores that are extremely difficult to crush and concentrate become much more easily disintegrated.

My invention is carried out as follows: Ore is placed, preferably, over a wood fire upon the grate of an ordinary kiln, such as used for calcining lime, then a layer of fuel, another layer of ore, and so on, making alternate layers of wood and ore until the furnace is charged. The ore is thus heated to a high temperature, but not sufficiently high as to fuse the same. The charges are then drawn, beginning at the bottom of the kiln, into an iron car or other suitable receptacle, a layer of niter cake is sifted or otherwise spread upon the heated ore, and finally the whole is sprayed with water of about 60° Fahrenheit. This process lessens the cohesion of the ore-body thus partially disintegrated and is easily crushed by a rock-breaker or other like means.

I have found by my experiments that the following are the preferable proportions for the compound: to one thousand pounds (avoirdupois) of ore five pounds (avoirdupois) of chlorid of sodium and twenty gallons of water.

Having described my invention, what I claim, and desire to secure by Letters Patent, is—

1. The hereinbefore-described process of treating and disintegrating ores, which consists in heating the ore to a high temperature, applying niter cake thereto and, while still hot, treating the same with water, substantially as set forth.

2. The hereinbefore-described process of treating and disintegrating ores, which consists in treating the ore at a high temperature with a salt, which is capable of attacking the ore at a high temperature and, while still hot, treating the same with water, substantially as set forth.

In testimony whereof I affix my signature in presence of two witnesses.

HARRY LUCKENBACH.

Witnesses:
PAUL BARNES,
ERNEST E. GILMER.